United States Patent [19]

Olson et al.

[11] 4,435,379

[45] Mar. 6, 1984

[54] PROCESS FOR TREATING CHLORINATED HYDROCARBONS

[75] Inventors: Robert S. Olson, Lafayette; Joseph P. Surls, Jr., Walnut Creek; Ben F. West, Concord, all of Calif.

[73] Assignee: The Dow Chemical Company, Midland, Mich.

[21] Appl. No.: 409,383

[22] Filed: Aug. 18, 1982

[51] Int. Cl.$^3$ .................. C01B 9/02; C01G 27/00; C01G 41/00; C01G 25/00

[52] U.S. Cl. .................. 423/472; 423/491; 423/492; 423/493; 423/496; 423/60; 423/62; 423/69; 75/111; 75/112; 75/113

[58] Field of Search .............. 423/491, 492, 493, 496, 423/472, 62, 60, 82, 69; 75/111, 112, 113

[56] References Cited

U.S. PATENT DOCUMENTS 2,486,912  11/1949  Belchety.
3,305,300   2/1967  McBrayer.

FOREIGN PATENT DOCUMENTS 2311213  7/1974  Fed. Rep. of Germany.
2316318 10/1974  Fed. Rep. of Germany.
 150189  8/1981  German Democratic Rep..
1285129  8/1972  United Kingdom.

OTHER PUBLICATIONS

Bardawil et al., "Synthesis of Anhydrous Metal Chlorides by the Action of Chlorocarbon Solvents on Some Metal Oxides and Sulphides," Journal of the Less-Common Metals, vol. 9, pp. 20–24, 1965.
Reprasov, IM "Behavior of Hexachlorobenzene during Titanium IV Chloride Production," Chem. Abst. 95: 206, 185, 1981.
Clark, R. J. H., *Chemistry of Titanium and Vanadium* Elsevier Publishing, pp. 28–29 (1968).
Kirk-Othmer, *Encyclopedia of Chemical Technology* 3rd Ed., vol. 5, p. 696, Wiley-Interscience (1980).
Greenfield, B. F. et al., "The Conversion of Beryllia to Anhydrous Beryllium Chloride," U.K. Atomic Energy Authority Research Report #AERE-R4149 (1962).
Silber; P.; Noveau Traite de Chimie. Minerale, vol. 4, (1958).
Atkinson, Russell H. et al., "Analytical Chemistry of Niobium and Tantalum," *Analytical Chemistry*, vol. 24, No. 3, pp. 480–488 (1952).

*Primary Examiner*—Edward J. Meros
*Assistant Examiner*—Robert L. Stoll

[57] ABSTRACT

A process is described for reacting chlorinated hydrocarbons other than carbon tetrachloride with metal oxides so as to convert essentially all of the carbon atoms to oxides of carbon. This process provides an efficient and economical means for utilizing chlorinated hydrocarbons.

11 Claims, No Drawings

PROCESS FOR TREATING CHLORINATED HYDROCARBONS

BACKGROUND OF THE INVENTION

This is a novel process for converting chlorinated hydrocarbons to metal chlorides and oxides of carbon.

Undesirable chlorinated hydrocarbons are conventionally handled by incineration. However, such operations are generally expensive in part because of the fuel required to sustain combustion. Moreover, nitrogen oxides or other undesirable by-products may be produced. Accordingly, it would be desirable to have a method of converting chlorinated hydrocarbons to useful products.

U.S. Pat. No. 2,486,912 teaches that carbon tetrachloride can be reacted with titanium dioxide to yield titanium tetrachloride and oxides of carbon. However, other chlorinated hydrocarbons are generally recognized to be much less reactive (unless the chlorinated compound decomposes to carbon tetrachloride at the reaction conditions).

Unexpectedly, it has now been found that by maintaining he appropriate ratio of carbon to available oxygen, virtually all chlorinated hydrocarbons will essentially completely react with a suitable refractory metal oxide.

SUMMARY OF THE INVENTION

According to this invention, a chlorinated hydrocarbon other than carbon tetrachloride is converted to a metal chloride or metal oxychloride and oxide of carbon by reaction with a suitable refractory metal oxide. This process comprises the step of contacting at reactive conditions at least one chlorinated hydrocarbon with a sufficient quantity of the refractory metal oxide and chlorine or oxygen to convert substantially all (at least 90 percent) of the carbon atoms present in the chlorinated hydrocarbon to carbon monoxide or carbon dioxide.

DETAILED DESCRIPTION OF THE INVENTION

The chlorinated hydrocarbons reacted in the subject process are part of a large, but well known class of compounds. These comounds include any known compound corresponding to the formula, $C_aH_bCl_c$, wherein "a" is an integer greater than 1, "c" is an integer greater than 0 and "b" is an integer equal to at least 0. Also excluded are compounds which decompose completely at the instant reaction conditions to $CCl_4$. However, mixtures of said chlorinated hydrocarbons, including mixtures with $CCl_4$, may also be employed.

Preferably, in the formula $C_aH_bCl_c$, $c \geq b$; more preferably $b=0$. Preferred chlorinated hydrocarbons include hexachlorobutadiene and hexachloroethane. Especially preferred are aromatic chlorinated hydrocarbons, such as hexachlorobenzene or polychlorinated biphenyls, which are particularly difficult to deal with by conventional methods. In some embodiments of this invention, these preferred chlorinated hydrocarbons form during the reaction of carbon and chlorine, carbon tetrachloride or other chlorinated hydrocarbon feeds with metal oxides.

The refractory metal oxides to be reacted with the chlorinated hydrocarbons are also known in the art. See, e.g., Kirk-Othmer, Encyclopedia of Chemical Technology, 2nd Ed., Vol. 17, pp. 227–267 (1968). Oxides of metals selected from Groups IVb, Vb, VIb, VIIb, IIIa and IVa (excluding carbon, of course) of the standard periodic table of the elements and oxides of beryllium, magnesium, thorium and uranium are in general operable, as long as these metal oxides are normally solid at the reaction temperature employed.

From a thermodynamic standpoint, the metal chloride or oxychloride derived by chlorination of the metal oxide or mixture of oxides as a starting material typically will possess a more positive Gibb's free energy of formation at temperatures in the desired operating range (e.g., 500° to 1200° C.) on a balanced chemical equivalent basis than the starting materials. That is, the metal oxide generally cannot be chlorinated with chlorine in the absence of a carbon-containing material which is contemporaneously oxidized. However, iron oxide is an exception. Generally, the free energy of formation per equivalent of oxygen in a mole of the metal oxide starting material should not be substantially more negative (i.e., an absolute difference of more than 47,000 calories at 500° C. or 58,000 calories at 1200° C.) than the free energy of formation on a molar basis of the metal chloride or the metal oxychloride product per two atoms of chlorine present in the chemical formula of the product. The necessary free energy data to evaluate the thermodynamics of the reaction is available in "JANAF Thermochemical Tables", (available as National Bureau of Standards Publication 37) and other similar compilations.

In general, metal oxides are preferred but partially chlorinated derivatives of these oxides can also be employed and may be formed in situ during chlorination of the metal oxide. The operable metal oxides include oxides of titanium (IV), aluminum (III), iron (II and III), zirconium (IV), tin (II and IV), vanadium (III, IV and V) and chromium (III and IV). Titanium dioxide and aluminum oxide ($Al_2O_3$) are preferred as metal oxides. The metal oxides can be employed in a refined state. Generally, metal oxides present in a crude mineral ore are operable and less expensive than the refined material. These mineral ores optionally can include silicates. Alternatively, the metal oxide can be partially hydrated; activated alumina is an example of such a hydrate. Illustrative ores include fosterite, spinel, zircon and mullite. Preferred are rutile or ilmenite mineral ores.

Advantageously, sufficient oxygen is available for reaction such that at least about one atom of oxygen is present for each atom of carbon introduced. Optionally, but less preferably, a less than stoichiometric amount of oxygen can be employed and some carbon will be formed. The oxygen involved in the reaction can be released by the metal oxide, if sufficient chlorine moieties are borne by the chlorinated hydrocarbon to displace a stoichiometric quantity of oxygen. Alternatively, an oxygen-containing gas can be introduced to the reaction mixture to provide additional oxygen directly or chlorine can be introduced to release additional oxygen from the metal oxide. A mixture of oxygen and chlorine gases can also be employed.

Preferably, the ratio of carbon atoms to oxygen atoms available for reaction is in the range from about 1:1 to about 2:1. An excess of available oxygen may result in chlorine gas being produced, while carbon may form at ratios less than stoichiometric. The oxygen available is the total of the oxygen introduced together with the oxygen released by the metal oxide or other oxygen-containing compounds present in reaction with chlorine introduced and the chlorine from the chlorinated hydrocarbon. Carbon or hydrocarbons may optionally be introduced along with or preceding the chlorinated hydrocarbon and oxidized to aid in achieving or maintaining the desired operating temperature.

It is important that sufficient chlorine be present to convert any hydrogen moieties present on the chlorinated hydrocarbon to hydrogen chloride. The hydrogen chloride can be conveniently separated from the product gases via conventional methods. In some instances it may be desirable to add hydrogen, hydrocarbons or water so that additional hydrogen chloride is produced. At least about a stoichiometric quantity or preferably an excess of metal oxide should be present to ensure essentially complete reaction of the chlorine moieties derived from the chlorinated hydrocarbon. In general, the hydrogen moieties from the hydrocarbon feed are more reactive toward chlorine than are metal oxides. Accordingly, the overall ratio of chlorine to hydrogen moieties must be at least 1:1 if any metal chloride is to be produced.

In one embodiment of the subject process, the chlorinated hydrocarbon and the oxygen or chlorine gases are first preheated as a mixture or separately to vaporize the chlorinated hydrocarbon. These reactants can be preheated in any conventional manner known in the art. Preferably, at least part of the heat is derived from heat exchange with the product gases once the process is underway. Alternatively, a liquid chlorinated hydrocarbon can be employed by introducing it directly to a heated metal oxide bed, where it is vaporized.

The chlorinated hydrocarbon and the oxygen or chlorine gas optionally together with a gas essentially inert in the reaction, such a nitrogen, are introduced to a packed or fluidized bed of the refractory metal oxide. Desirably, the metal oxide is present in particles having a high surface to volume ratio, but no so small that the gas flow is deleteriously impeded. Particles of from about 24 to about 325 U.S. Sieve size are preferred. An essentially inert packing material can also be employed to provide improved flow distribution of the gases.

The temperature during contact between the chlorinated hydrocarbon and the metal oxide is advantageously in the range from about 700° to about 1200° C., more preferably about 900° to about 1100° C. Temperatures below about 700° C. generally result in undesirably slow reaction rates. Temperature above about 1200° C. are not necessary and can necessitate the use of expensive materials in the reactor and associated equipment.

At the aforementioned reaction temperatures the reaction rate will generally be fairly rapid. Accordingly, a residence time of less than 1 second in the reaction zone will typically effect essentially complete conversion of most chlorinated hydrocarbons. Residence times of up to one minute may be necessary under less preferred conditions. Of course, the actual reaction time may be somewhat longer or may be as brief as 0.01 second depending on the specific metal oxide, the reaction temperature, the size of the metal oxide particles, the identity of the chlorinated hydrocarbon and other factors.

The pressure in the reaction zone is not generally critical. An absolute pressure of from about 0.1 to about 10 atmospheres is convenient, with a pressure of about 1 atmosphere being preferred.

The metal chloride or metal oxychloride produced in the preferred embodiments of the subject process have a greater value than the starting metal oxide. The metal chloride can be recovered by techniques known in the prior art. Generally, the metal chlorides formed will vaporize or sublime at the instant reaction conditions and can be recovered readily from the product gas stream by condensation. It is desirable to employ an excess of metal oxide in the subject process to prevent breakthrough of the chlorinated hydrocarbon through the reaction bed. Conveniently, this process is conducted continuously by introducing additional metal oxide to the reaction zone as metal chloride departs in the gas phase.

The following examples are presented to further illustrate the invention. All parts and percentages are by weight unless indicated otherwise.

EXAMPLES 1-8

Hexachlorobenzene was charged to a round-bottom flask equipped with a thermometer, a sparging tube for introducing gas into the hexachlorobenzene and a Vycor tube packed with a refractory metal oxide. The outlet of the Vycor column was connected sequentially to a first flask maintained at a temperature of 150° C., a second flask maintained at a temperature of about 25° C. and a gas scrubber containing a 0.1 molar aqueous solution of KI.

The Vycor tube was heated to a temperature of about 700°, 800° or 900° C. Chlorine gas was introduced to liquid hexachlorobenzene in a round-bottom flask at a rate monitored with a flowmeter. The hexachlorobenzene in the gas introduced into the Vycor column was estimated from empirical determination of mass transported at specific operating temperatures and rates of chlorine gas flow. Residence times for the gas in the packed bed were calculated from the free volume of the column and estimated feed gas volumes.

Any chlorinated hydrocarbon which broke through the packed column condensed in on of the two flasks in line after the column. Cyclohexane and water were added to the contents of each of these two flasks. The metal and chloride ions were analyzed by conventional methods to identify the metal chloride present in the aqueous phase. The chlorinated hydrocarbon present in the organic phase was also analyzed. The quantity of chlorine removed by the scrubber was also determined by standard methods. Chlorine efficiency was then determined by dividing the chlorine content of the metal chloride product by the sum of the chlorine content of the metal chloride, chlorinated hydrocarbon recovered and chlorine in the scrubber.

Table I tabulates the metal oxide, $C_6Cl_6$ flow rate in cubic centimeters (cc) per minute (min), chlorine flow rate in cc/min, packed bed temperature, gas residence time, run time, chlorine efficiency and quantity of unreacted chlorocarbon in grams (g) for each of eight runs.

TABLE I

| Example | Metal Oxide (Weight) | $C_6Cl_6$ (cc/min) | $Cl_2$ (cc/min) | Temp. (°C.) | Res. Time (Sec.) | Run (Min.) | $Cl_2$ Efficiency | Recovered $C_aCl_c$ (g) |
|---------|----------------------|--------------------|-----------------|-------------|------------------|------------|-------------------|--------------------------|
| 1 | Rutile (50 g) | 5-8 | 7-24 | 800 | 2-5 | 195 | 94% | N.D. |

TABLE I-continued

| Example | Metal Oxide (Weight) | $C_6Cl_6$ (cc/min) | $Cl_2$ (cc/min) | Temp. (°C.) | Res. Time (Sec.) | Run (Min.) | $Cl_2$ Efficiency | Recovered $C_aCl_c$ (g) |
|---|---|---|---|---|---|---|---|---|
| 2 | Rutile (25 g) | 1.5–7 | 5–9 | 800 | 3–7 | 270 | N.D. | N.D. |
| 3 | Rutile (20 g) | 2–5 | 10–15 | 800 | 2–3 | 200 | 94% | 0.36 |
| 4 | Rutile (15 g) | 0.8 | 2.8 | 800 | 6 | 260 | 91% | Trace |
| 5 | Activated Alumina (12 g) | 0.7 | 3.2 | 800 | 50 | 300 | 95% | 0.03 |
| 6 | Magnetite* (30 g) | 0.7–1.5 | 6–8 | 500–800 | 7 | 260 | N.D. | 0.2 |
| 7 | Calcined Alumina** (9 g) | 0.7 | 5 | 900 | 9 | 285 | 96% | 0.09 |
| 8 | Rutile, (68 g) | 7 | 10 | 800 | 6 | 110 | 96% | — |

N.D. = Not determined.
*>95% $Fe_2O_3$.
**~80% $-Al_2O_3$

The data in Table I indicates that hexachlorobenzene can be essentially completely reacted with a variety of metal oxides in the presence of chlorine to produce a metal chloride.

EXAMPLES 9–12

In a manner otherwise similar to Example 1, hexachlorobenzene was reacted with rutile in the presence of air instead of chlorine. The operating parameters and weight of the metal chloride and chlorinated hyrocarbon recovered are tabulated in Table II. No oxides of nitrogen were detected in the product gases.

TABLE II

| Example | Metal Oxide (Weight) | $C_6Cl_6$ (cc/min) | Air (cc/min) | Temp. (°C.) | Res. Time (Sec.) | Run (min.) | Metal Chloride (g) | Recovered $C_aCl_c$ (g) |
|---|---|---|---|---|---|---|---|---|
| 9 | Act. Alumina (56 g) | 2–3.5 | 20 | 800 | 30–35 | 710 | 3.7 | 0.006 |
| 10 | Act. Alumina (56 g) | 2.5 | 10 | 700 | 60 | 300 | 1.2 | 1.31 |
| 11 | Rutile (66 g) | 2.4 | 5 | 800 | 12 | 290 | 7.2 | — |
| 12 | Rutile (65 g) | 3.4 | 15 | 900 | 15 | 200 | 5.0 | — |

The data in Table II shows that hexachlorobenzene can be essentially completely reacted with rutile or $Al_2O_3$ in the presence of air.

EXAMPLE 13

Hexachlorobutadiene was reacted at 900° C. with a packed bed of 58 grams of rutile in a manner otherwise similar to Example 1. The flow rate of $C_4Cl_6$ and $Cl_2$ was 30 cc/min for each gas for 26 minutes and then was increased to 50 cc/min for each gas for a period of 24 minutes. Also 20 cc/min of nitrogen were introduced during the 50-minute reaction period. Essentially all of the $C_4Cl_6$ introduced was converted to metal chloride and oxides of carbon.

EXAMPLE 14

Hexachloroethane was reacted at 900° C. with a packed bed of 35 grams of rutile in a manner otherwise similar to Example 1 except that no chlorine gas was introduced and instead nitrogen gas was used as a carrier in a volume of 40 cc/min. The gas residence time in the bed was about 1 second.

Only 0.04 gram of chlorocarbon was isolated from the gas product stream, but approximately ten grams of metal chloride was recovered. The chlorocarbon recovered was predominantly hexachlorobenzene.

EXAMPLE 15

A column 2.2 centimeters (cm) in diameter and 34 cm in length was equipped with a ceramic frit at one end and disposed vertically. On the frit was placed about 10 grams of Vycor (a high-silica glass) chips, followed by 10 grams of 48 mesh $Al_2O_3$. To the next portion of the column was introduced 162.7 grams of DENSTONE 57, a one-quarter inch in diameter, spherical, aluminum silicate packing material obtained from Norton Company, and 38.1 grams of fluidized $Al_2O_3$ to produce a packed fluidized bed 32 cm in height. Each end of the column was connected to a truncated cone which connected the column to a smaller diameter gas inlet or outlet pipe while maintaining good gas flow distribution.

To the packed fluidized bed maintained at a temperature of 900° C. was introduced a gas mixture of hexachlorobenzene and chlorine at various gas flow rates. Operating parameters and products recovered in sequential runs using the same bed are compiled in Table III.

TABLE III

| Run | $Al_2O_3$ (g) | $C_6Cl_6$ (cc/min) | $Cl_2$ (cc/min) | Res. Time (sec.) | Run (Min.) | Recovered $AlCl_3$ (g) | Recovered $C_aCl_c$ (g) |
|---|---|---|---|---|---|---|---|
| 1 | 38.1 | 6.9 | 50 | 12 | 77 | 14.3 | 0.07 |
| 3 | ~34 | 11 | 75 | 8 | 22 | 7.2 | 0.80 |
| 4 | ~32 | 12 | 50 | 11 | 30 | 7.6 | 0.18 |
| 5 | ~30 | 17 | 75 | 8 | 45 | 20.5 | 0.47 |

What is claimed is:

1. A process for using a chlorinated hydrocarbon to convert a metal oxide to a metal chloride or metal oxychloride, said process consisting essentially of:
   contacting at reactive conditions at least one gaseous chlorinated hydrocarbon of the formula $C_aH_bCl_c$, wherein "a" is an integer greater than 1, "c" is an integer greater than 0 and "b" is an integer equal to at least 0, with a sufficient quantity of a suitable refractory metal oxide and a sufficient quantity of chlorine to convert substantially all of the carbon atoms of the chlorinated hydrocarbon to carbon monoxide or carbon dioxide and to convert any hydrogen moieties present on the chlorinated hydrocarbon to hydrogen chloride, wherein the ratio of carbon atoms present to oxygen atoms available for reaction is in the range from about 1:1 to about 1:2 and the metal oxide is chlorinated contemporaneously with the oxidation of the chlorinated hydrocarbon.

2. The process as described in claim 1 wherein the metal oxide is selected from oxides of titanium (IV), aluminum (III), iron (II and III), zirconium (IV), tin (II and IV), vanadium (III, IV and V) and chromium (III and IV).

3. The process as described in claim 1 wherein the metal oxide is titanium dioxide or an aluminum oxide.

4. The process as described in claim 3 wherein the titanium dioxide is present in rutile or ilmenite.

5. The process as described in claim 1 wherein the chlorinated hydrocarbon bears at least one aryl moiety.

6. The process as described in claim 1 where in the formula $C_aH_bCl_c$, $c \geq b$.

7. The process as described in claim 6 wherein the chlorinated hydrocarbon is hexachlorobenzene, polychlorinated biphenyls or mixtures thereof with other chlorinated hydrocarbons.

8. The process as described in claim 6 wherein the chlorinated hydrocarbon is hexachlorobutadiene or hexachloroethane.

9. The process as described in claim 7 wherein the metal oxide is aluminum oxide or titanium dioxide.

10. The process as described in claim 9 wherein the reaction temperature is in the range from 900° to 1200° C.

11. The process as described in claim 1 wherein $b=0$.

* * * * *